United States Patent
Cho et al.

(10) Patent No.: US 12,262,003 B2
(45) Date of Patent: *Mar. 25, 2025

(54) VIDEO ENCODING/DECODING METHOD AND DEVICE, AND RECORDING MEDIUM HAVING BITSTREAM STORED THEREIN

(71) Applicant: ELECTRONICS AND TELECOMMUNICATIONS RESEARCH INSTITUTE, Daejeon (KR)

(72) Inventors: Seung Hyun Cho, Daejeon (KR); Jung Won Kang, Daejeon (KR); Sung Chang Lim, Daejeon (KR); Hyun Suk Ko, Daejeon (KR); Dong San Jun, Daejeon (KR); Jin Ho Lee, Daejeon (KR); Ha Hyun Lee, Seoul (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,160

(22) Filed: Jun. 29, 2023

(65) Prior Publication Data

US 2023/0344993 A1 Oct. 26, 2023

Related U.S. Application Data

(63) Continuation of application No. 17/401,424, filed on Aug. 13, 2021, now Pat. No. 11,805,247, which is a
(Continued)

(30) Foreign Application Priority Data

Sep. 13, 2016 (KR) .................. 10-2016-0117900

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/119* (2014.11); *H04N 19/176* (2014.11); *H04N 19/96* (2014.11)

(58) Field of Classification Search
CPC ...... H04N 19/11; H04N 19/96; H04N 19/119; H04N 19/176; H04N 19/105
See application file for complete search history.

(56) References Cited

U.S. PATENT DOCUMENTS 10,129,542 B2 * 11/2018 Gu .................. H04N 19/182
10,390,021 B2 * 8/2019 Xu .................. H04N 19/196
(Continued)

FOREIGN PATENT DOCUMENTS

CN 103200401 A 7/2013
CN 103460700 A 12/2013
(Continued)

OTHER PUBLICATIONS

International Search Report issued on Dec. 11, 2017 in corresponding International Patent Application No. PCT/KR2017/009945 (2 pages in English and 2 pages in Korean).
(Continued)

Primary Examiner — Zaihan Jiang
(74) Attorney, Agent, or Firm — NSIP Law

(57) ABSTRACT

An image encoding/decoding method and apparatus for performing intra prediction are provided. An image decoding method of the present invention comprises deriving an intra-prediction mode for a current block, determining whether or not a left boundary or an upper boundary of the current block is a boundary of a predetermined image
(Continued)

region, configuring a reference sample by using at least one reconstructed sample included in at least one reconstructed sample line adjacent to the current block based on the determination result, and performing intra-prediction for the current block based on the intra-prediction mode and the reference sample.

16 Claims, 6 Drawing Sheets

Related U.S. Application Data continuation of application No. 16/325,253, filed as application No. PCT/KR2017/009945 on Sep. 11, 2017, now Pat. No. 11,128,862.

(51) Int. Cl.
*H04N 19/119* (2014.01)
*H04N 19/176* (2014.01)
*H04N 19/96* (2014.01)

(56) References Cited

U.S. PATENT DOCUMENTS

| | | | | |
|---|---|---|---|---|
| 10,856,009 | B2* | 12/2020 | Chuang | H04N 19/513 |
| 2013/0016774 | A1 | 1/2013 | Oh | |
| 2013/0034158 | A1* | 2/2013 | Kirchhoffer | H04N 19/593 |
| | | | | 375/E7.243 |
| 2013/0128961 | A1 | 5/2013 | Kim et al. | |
| 2013/0171546 | A1 | 7/2013 | White et al. | |
| 2013/0301709 | A1* | 11/2013 | Lim | H04N 19/176 |
| | | | | 375/240.03 |
| 2013/0301714 | A1 | 11/2013 | Song et al. | |
| 2014/0334543 | A1 | 11/2014 | Lee et al. | |
| 2016/0044336 | A1 | 2/2016 | Lee et al. | |
| 2017/0094285 | A1* | 3/2017 | Said | H04N 19/593 |
| 2017/0272757 | A1* | 9/2017 | Xu | H04N 19/46 |
| 2019/0182481 | A1* | 6/2019 | Lee | H04N 19/176 |
| 2019/0306516 | A1* | 10/2019 | Misra | H04N 19/593 |

FOREIGN PATENT DOCUMENTS

| | | |
|---|---|---|
| CN | 104170379 A | 11/2014 |
| CN | 104602009 A | 5/2015 |
| CN | 104702950 A | 6/2015 |
| JP | 2013-141187 A | 7/2013 |
| KR | 10-2013-0105114 A | 9/2013 |
| KR | 10-2013-0109963 A | 10/2013 |
| KR | 10-2013-0137680 A | 12/2013 |
| KR | 10-2014-0019855 A | 2/2014 |
| KR | 10-2014-0080498 A | 6/2014 |
| KR | 10-2014-0089488 A | 7/2014 |
| KR | 10-2014-0124442 A | 10/2014 |
| KR | 10-2014-0124443 A | 10/2014 |
| WO | WO 2012/163199 A1 | 12/2012 |
| WO | WO 2014/200905 A2 | 12/2014 |
| WO | WO 2016/091122 A1 | 6/2016 |

OTHER PUBLICATIONS

Toru Kumakura, et al. "Intra prediction mode coding based on direction difference", *JCTVC of ITU-T and ISO/IEC. JCTVC-F3396th Meeting*: Torino, Jul. 1, 2011, pp. 1-13.

Yao-Jen Chang, et al. "Arbitrary reference tier for intra directional modes", *Joint Video exploration Team (JVET), JVET-C0043_r1 3rd Meeting*: Geneva, May 25, 2016, pp. 1-5.

Jianle Chen, et al. "Algorithm Description of Joint Exploration Test Model 3", *Joint Video exploration Team (JVET), JVET-C1001_v3 3rd Meeting*: Geneva, Jul. 6, 2016, pp. 1-34.

* cited by examiner

VIDEO ENCODING/DECODING METHOD AND DEVICE, AND RECORDING MEDIUM HAVING BITSTREAM STORED THEREIN

This application is a Continuation Application of U.S. patent application Ser. No. 17/401,424, filed on Aug. 13, 2021, which is a Continuation Application of U.S. patent application Ser. No. 16/325,253, filed on Feb. 13, 2019, now U.S. Pat. No. 11,128,862, issued on Sep. 21, 2021, which is a U.S. National Stage Application of International Application No. PCT/KR2017/009945, filed on Sep. 11, 2017, which claims the benefit under 35 USC 119(a) and 365(b) of Korean Patent Application No. 10-2016-0117900, filed on Sep. 13, 2016, in the Korean Intellectual Property Office.

TECHNICAL FIELD

The present invention relates to a method and apparatus for encoding/decoding an image and a recording medium storing a bitstream. Particularly, the present invention relates to a method and apparatus for encoding/decoding an image using intra prediction and a recording medium storing a bitstream generated by an image encoding method/apparatus of the present invention.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

In a conventional intra prediction, reconstructed samples located in a plurality of line buffers are used for constructing a reference sample. Therefore, when implementing an encoder/decoder, additional hardware resources and memory bandwidth are required comparing to a case where a single line buffer is used or a case where no line buffer is used.

DISCLOSURE

Technical Problem

An object of the present invention is to provide an image encoding/decoding method and apparatus enabling efficient usage of resources.

Another object of the present invention is to provide an image encoding/decoding method and apparatus which use resources required for an intra prediction efficiently.

Another object of the present invention is to provide a method and apparatus for determining the number and locations of reconstructed sample lines used for constructing a reference sample based on a location of the current block within a predetermined image region to decrease a size of a line buffer used for intra prediction.

Another object of the present invention is to provide a recording medium storing a bitstream generated by an image encoding method/apparatus of the present invention.

Technical Solution

An image decoding method according to the present invention may comprise deriving an intra-prediction mode for a current block, determining whether or not a left boundary or an upper boundary of the current block is a boundary of a predetermined image region, configuring a reference sample by using at least one reconstructed sample included in at least one reconstructed sample line adjacent to the current block based on the determination result, and performing intra-prediction for the current block based on the intra-prediction mode and the reference sample.

In an image decoding method of the present invention, the predetermined image region may be one of a picture, a slice, a slice segment, a tile, and a coding tree block.

In an image decoding method of the present invention, when both of the left boundary and the upper boundary of the current block are not the boundary of the predetermined image region, the reference sample may be configured by using a same reconstructed sample line for the left side and the upper side of the current block.

In an image decoding method of the present invention, when a first boundary among the left and upper boundaries of the current block is the boundary of the predetermined image region, and a remaining second boundary is not the boundary of the predetermined image region, a number of the reconstructed sample lines used for configuring the reference sample or a position thereof may be different with respect to the first boundary and the second boundary.

In an image decoding method of the present invention, the first boundary may be the upper boundary, and the second boundary may be the left boundary.

In an image decoding method of the present invention, when a single reconstructed sample line among the at least one reconstructed sample line is used for configuring the reference sample, a reference sample for the first boundary may be configured by using a reconstructed sample line that is mostly adjacent to the current block, and a reference sample for the second boundary may be configured by using a single reconstructed sample line that is selected from the at least one reconstructed sample line.

In an image decoding method of the present invention, when at least two reconstructed sample lines among the at least one reconstructed sample line are used when configuring the reference sample, a reference sample for the first boundary may be configured by using multiple times a reconstructed sample line that is mostly adjacent to the current block, and a reference sample for the second boundary may be configured by using at least two reconstructed sample lines selected among the at least one reconstructed sample line.

In an image decoding method of the present invention, when at least two reconstructed sample lines among the at least one reconstructed sample line are used to configure the reference sample, the reference sample may be configured by using at least one of a weighted sum, an average value, a maximum value, a minimum value, and a median value of at least two reconstructed samples on the at least two reconstructed sample lines.

In an image decoding method of the present invention, positions of the at least two reconstructed samples may be variably determined based on a position of a prediction target sample within the current block.

In an image decoding method of the present invention, a weight used in the weighted sum may be determined based on a distance from the current block.

In an image decoding method of the present invention, when both of the left and upper boundaries of the current block are boundaries of the predetermined image region, the reference sample may be configured by using a same reconstructed sample line or different reconstructed sample lines for the left side and the upper side of the current block.

In an image decoding method of the present invention, when the reference sample is configured by using different reconstructed sample lines for the left side and the upper side of the current block, a number of reconstructed sample lines used for the left side of the current block may be larger than a number of reconstructed sample lines used for the upper side of the current block.

An image encoding method according to the present invention may comprise determining an intra-prediction mode for a current block, determining whether or not a left boundary or an upper boundary of the current block is a boundary of a predetermined image region, configuring a reference sample by using at least one reconstructed sample included in at least one reconstructed sample line adjacent to the current block based on the determination result, and performing intra-prediction for the current block based on the intra-prediction mode and the reference sample.

An image decoding apparatus according to the present invention may comprise an intra predictor which is configured to derive an intra-prediction mode for a current block, determine whether or not a left boundary or an upper boundary of the current block is a boundary of a predetermined image region, configure a reference sample by using at least one reconstructed sample included in at least one reconstructed sample line adjacent to the current block based on the determination result, and perform intra-prediction for the current block based on the intra-prediction mode and the reference sample.

An image encoding apparatus may comprise an intra predictor which is configured to determine an intra-prediction mode for a current block, determine whether or not a left boundary or an upper boundary of the current block is a boundary of a predetermined image region, configure a reference sample by using at least one reconstructed sample included in at least one reconstructed sample line adjacent to the current block based on the determination result, and perform intra-prediction for the current block based on the intra-prediction mode and the reference sample.

A recording medium according to the present invention may store a bitstream generated by an image encoding method according to the present invention.

Advantageous Effects

According to the present invention, an image encoding/decoding method and apparatus enabling efficient usage of resources may be provided.

And according to the present invention, an image encoding/decoding method and apparatus which use resources required for an intra prediction efficiently may be provided.

And according to the present invention, an image encoding/decoding method and apparatus for decreasing hardware resources and bandwidth required for implementing an encoder/decoder by decreasing a size of a line buffer used for intra prediction may be provided.

And according to the present invention, a recording medium storing a bitstream generated by an image encoding method/apparatus of the present invention may be provided.

MODE FOR INVENTION

Figure 1:
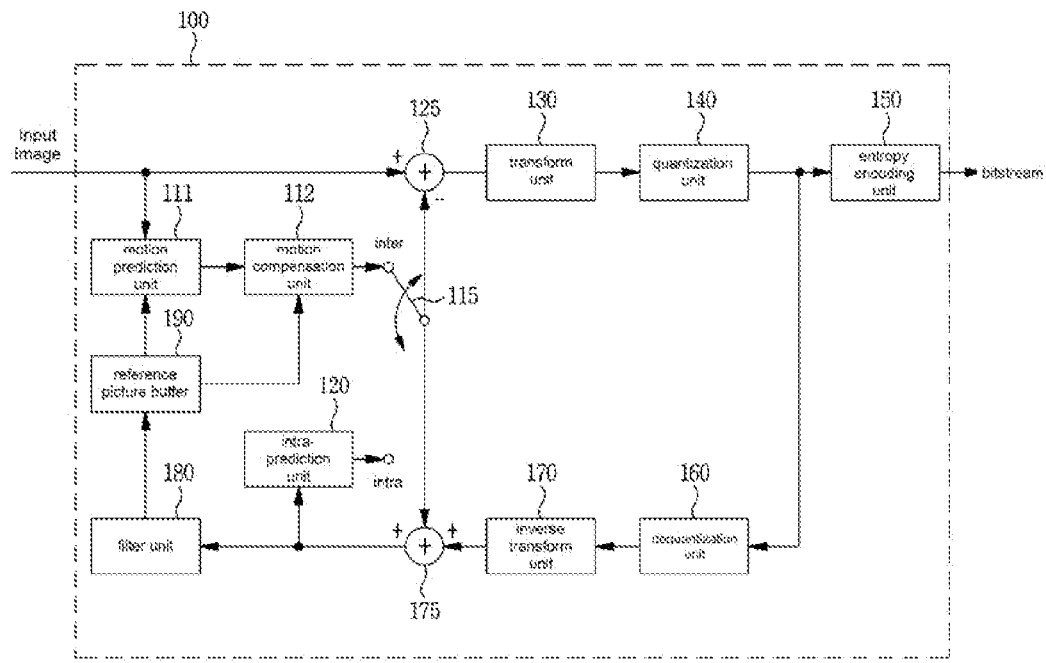
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Description of Terms

Encoder: means an apparatus performing encoding.

Decoder: means an apparatus performing decoding

Block: is an M×N array of a sample. Herein, M and N mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel.

Unit: refers to an encoding and decoding unit. When encoding and decoding an image, the unit may be a region generated by partitioning a single image. In addition, the unit may mean a subdivided unit when a single image is partitioned into subdivided units during encoding or decoding. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method and a binary-tree partitioning method to configure a lower unit such as coding unit, prediction unit, transform unit, etc. It may be used as a term for designating a pixel block that becomes a process unit when encoding/decoding an image as an input image.

Coding Tree Block: may be used as a term for designating any one of a Y coding tree block, Cb coding tree block, and Cr coding tree block.

Neighbor Block: means a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: means a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at the same position as the current block of the current picture within a reference picture, or a neighbor block thereof.

Unit Depth: means a partitioned degree of a unit. In a tree structure, a root node may be the highest node, and a leaf node may be the lowest node. In addition, when a unit is expressed as a tree structure, a level in which a unit is present may mean a unit depth.

Bitstream: means a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Unit: means a basic unit when performing prediction such as inter-prediction, intra-prediction, inter-compensation, intra-compensation, and motion compensation. A single prediction unit may be partitioned into a plurality of partitions with a small size, or may be partitioned into a lower prediction unit.

Prediction Unit Partition: means a form obtained by partitioning a prediction unit.

Transform Unit: means a basic unit when performing encoding/decoding such as transform, reverse-transform, quantization, dequantization, transform coefficient encoding/decoding of a residual signal. A single transform unit may be partitioned into a plurality of transform units having a small size.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a reverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a pixel value of a block that has been already encoded/decoded and is adjacent to a current block as a reference pixel. The intra-prediction unit 120 may perform spatial prediction by using a reference pixel, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. The reference image may be stored in the reference picture buffer 190.

The motion compensation unit 112 may generate a prediction block by performing motion compensation using a motion vector. Herein, inter-prediction may mean inter-prediction or motion compensation.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of pixel information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level, the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a block size, a block depth, block partition information, a unit size, a unit depth, unit partition information, a partition flag of a quad-tree form, a partition flag of a binary-tree form, a partition angle of a binary-tree form, an intra-prediction mode, an intra-prediction angle, a reference sample filtering method, a prediction block boundary filtering method, a filter tap, a filter coefficient, an inter-prediction mode, motion information, a motion vector, a reference image index, an inter-prediction angle, an inter-prediction indicator, a reference image list, a motion vector predictor, a motion vector candidate list, whether or not a motion merge mode is used, a motion merge candidate, a motion merge candidate list, whether or not a skip mode is used, an interpolation filter type, a motion vector size, a presentation accuracy of a motion vector, a transform type, a transform size, information of whether or not an additional (secondary) transform is used, information of whether or not a residual signal is present, a coded block pattern, a coded block flag, a quantization parameter, a quantization matrix, in-loop filter information, information of whether or not an in-loop filter is applied, an in-loop filter coefficient, binarization/reverse-binarization method, a context model, a context bin, a bypass bin, a transform coefficient, a transform coefficient level, a transform coefficient level scanning method, an image displaying/outputting sequence, slice identification information, a slice type, slice partition information, tile identification information, a tile type, tile partition information, a picture type, a bit depth, and information of a luma signal or chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image.

A quantized level may be dequantized in the dequantization unit 160, or may be reverse-transformed in the reverse-transform unit 170. A dequantized or reverse-transformed coefficient or both may be added with a prediction block by the adder 175. By adding the dequantized or reverse-transformed coefficient or both with the prediction block, a reconstructed block may be generated. Herein, the dequantized or reverse-transformed coefficient or both may mean a coefficient on which at least one of dequantization and reverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to the reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based pixels included in several rows or columns which are included in the block. When a deblocking filter is applied to a block, another filter may be applied according to a required deblocking filtering strength.

In order to compensate an encoding error, a proper offset value may be added to a pixel value by using a sample adaptive offset. The sample adaptive offset may correct an offset of a deblocked image from an original image by a pixel unit. A method of partitioning pixels of an image into a predetermined number of regions, determining a region to which an offset is applied, and applying the offset to the determined region, or a method of applying an offset in consideration of edge information on each pixel may be used.

The adaptive loop filter may perform filtering based on a comparison result of the filtered reconstructed image and the original image. Pixels included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

Figure 2:
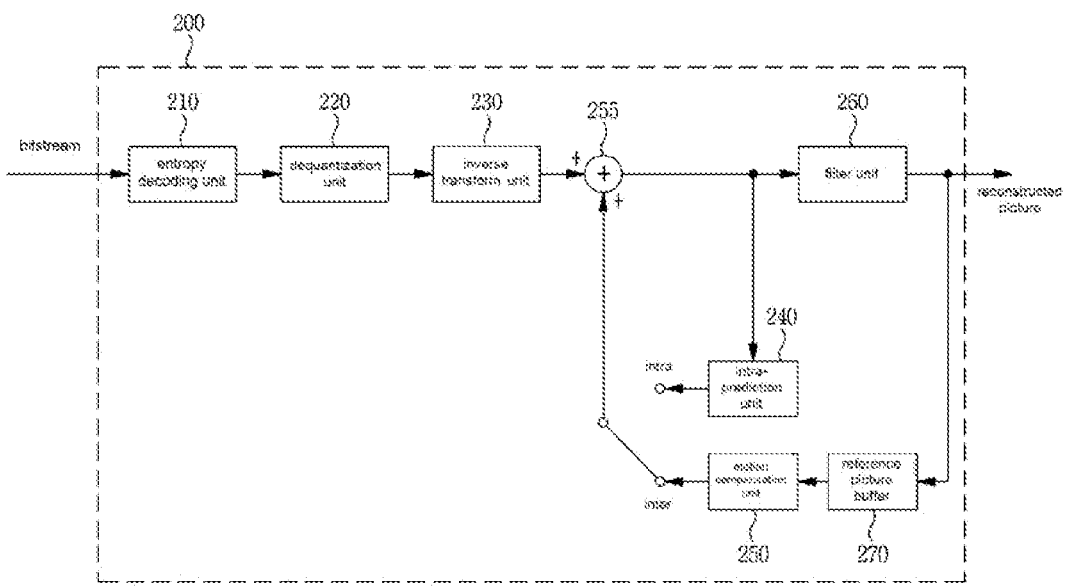
FIG. 2 is a block diagram showing configurations of a decoding apparatus according to an embodiment of the present invention.

The reconstructed block or the reconstructed image having passed through the filter unit 180 may be stored in the reference picture buffer 190. FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a reverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a reverse-process of the entropy encoding method described above.

In order to decode a transform coefficient level, the entropy decoding unit 210 may change a one-directional vector form coefficient into a two-dimensional block form by using a transform coefficient scanning method.

A quantized level may be dequantized in the dequantization unit 220, or reverse-transformed in the reverse-transform unit 230. The quantized level may be a result of dequantizing or reverse-transforming or both, and may be generated as a reconstructed residual block. Herein, the dequantization unit 220 may apply a quantization matrix to the quantized level.

When an intra mode is used, the intra-prediction unit 240 may generate a prediction block by performing spatial prediction that uses a pixel value of a block adjacent to a decoding target block and which has been already decoded. When an inter mode is used, the motion compensation unit 250 may generate a prediction block by performing motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction.

Figure 3:
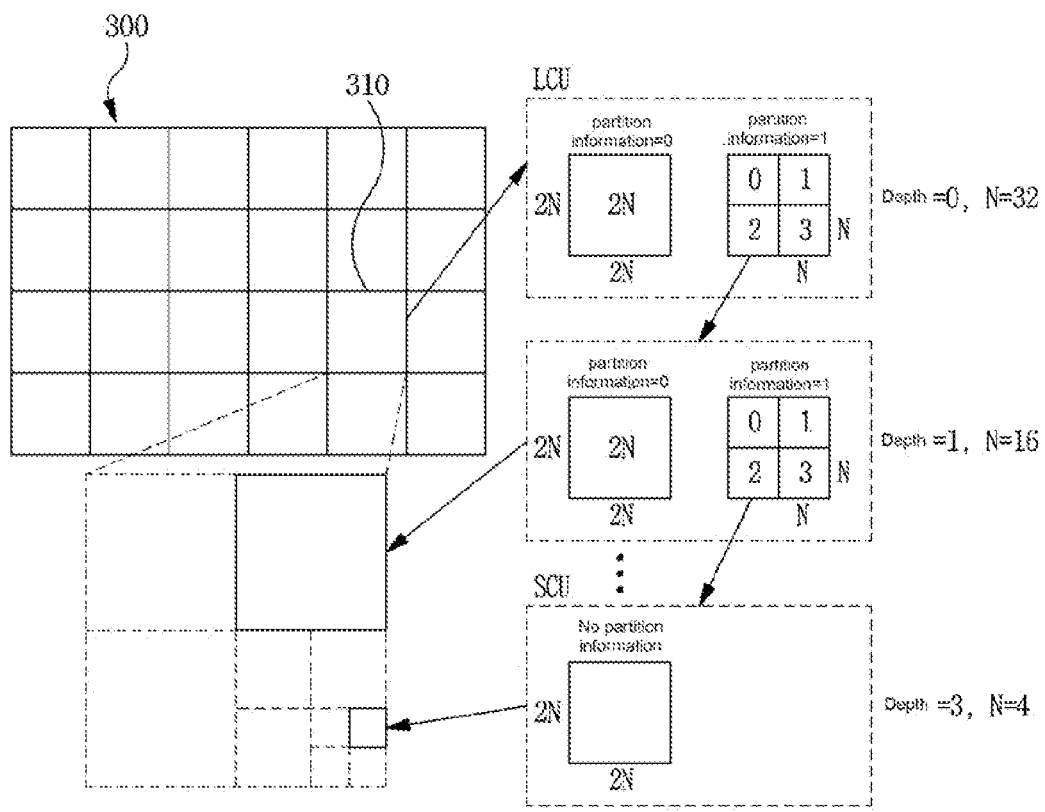
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra mode and an inter mode when encoding/decoding the image. The coding unit may be a basic unit used for prediction, transform, quantization, reverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned in a layer associated with depth information based on a tree structure. Each of partitioned lower unit may have depth information. Depth information may be information representing a size of a CU, and may be stored in each CU.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. When a single coding unit is partitioned into two coding units, it may be called that the coding unit is partitioned in a binary-tree form. An LCU 320 of FIG. 3 is an example of an LCU to which both of partitioning of a quad-tree form and partitioning of a binary-tree form are applied.

Figure 4:
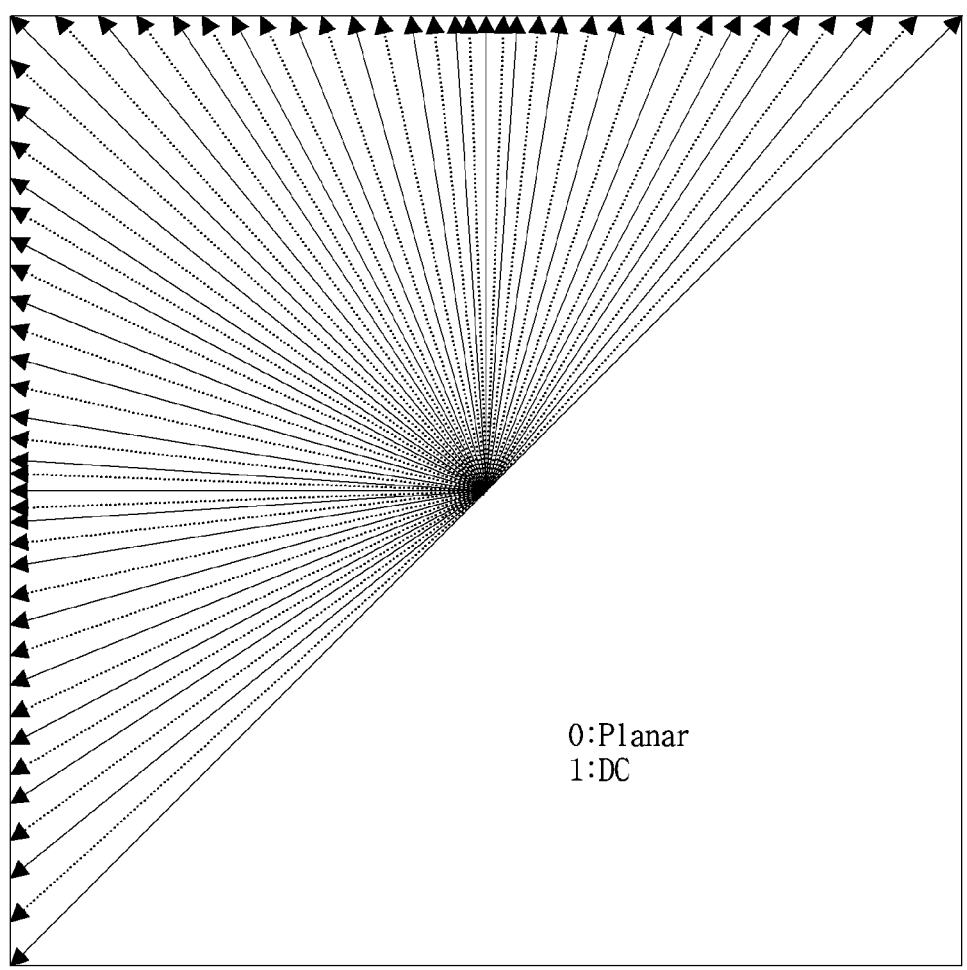
FIG. 4 is a view for explaining an embodiment of a process of intra prediction.

FIG. 4 is a view showing an intra-prediction process.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, and a mode angle. A number of intra-prediction modes may be M including 1, and the non-angular and the angular mode.

A number of intra-prediction modes may be fixed to N regardless of a block size. Alternatively, a number of intra-prediction modes may vary according to a block size or a color component type or both. For example, as a block size becomes large, a number of intra-prediction modes may increase. Alternatively, a number of intra-prediction modes of a luma component block may be larger than a number of intra-prediction modes of a chroma component block.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
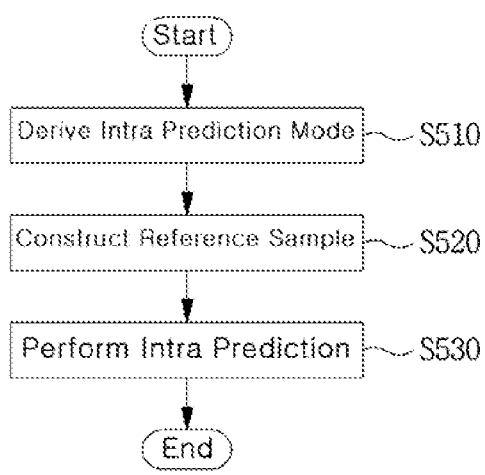
FIG. 5 is a view showing intra-prediction according to the present invention.

FIG. 5 is a view showing intra-prediction according to the present invention.

Intra-prediction of a current block may include: step S510 of deriving an intra-prediction mode, step S520 of configuring a reference sample, and/or step S530 of performing intra-prediction.

In step S510, an intra-prediction mode of a current block may be derived. The intra-prediction mode of the current block may be derived by using a method of using an intra-prediction mode of a neighbor block, a method of entropy encoding/decoding an intra-prediction mode of a current block from a bitstream, or a method of using a coding parameter of a neighbor block. According to the method of using the intra-prediction mode of the neighbor block, the intra-prediction mode of the current block may be derived by using at least one intra-prediction mode derived by using an intra-prediction mode of a neighbor block, a combination of at least one intra-prediction mode of a neighbor block, and at least one MPM.

In step S520, a reference sample may be configured by performing at least one of reference sample selecting and reference sample filtering.

In step S530, intra-prediction may be performed by performing at least one of non-angular prediction, angular prediction, positional information based prediction, and luma/chroma signal based prediction. When angular prediction is performed, prediction having angles different by a predetermined unit that includes at least one sample of the current block may be performed. The predetermined unit may be, for example, at least one of a singular sample, a sample group, a line, and a block. In step S530, filtering on a prediction sample may be additionally performed.

In order to derive the intra-prediction mode of the current block, at least one reconstructed neighbor block may be used. A position of the reconstructed neighbor block may be a fixed position that is predefined, or may be a position derived by encoding/decoding. Hereinafter, encoding/decoding may mean entropy encoding and decoding. For example, when a coordinate of a left upper corner side sample of a current block having a W×H size is (0, 0), a neighbor block may be at least one of blocks adjacent to coordinate of (−1, H−1), (W−1, −1), (W, −1), (−1, H), and (−1, −1), and neighbor blocks of the above blocks.

An intra-prediction mode of a neighbor block which is not available may be replaced with a predetermined intra-prediction mode. The predetermined intra-prediction mode may be, for example, a DC mode, a planar mode, a vertical mode, a horizontal mode, and/or a diagonal mode. For example, when a neighbor block is positioned outside of a boundary of at least one predetermined unit of a picture, a slice, a tile, and a coding tree unit, the neighbor block is inter-predicted, or when the neighbor block is encoded in a PCM mode, the corresponding block may be determined as non-available.

The intra-prediction mode of the current block may be derived as a statistical value of an intra-prediction mode of a predetermined positional neighbor block or an intra-prediction mode of at least two neighbor blocks. In the present description, the statistical value may mean at least one of an average value, a maximum value, a minimum value, a mode, a median value, a weighted average value, and an interpolation value.

Alternatively, the intra-prediction mode of the current block may be derived based on a size of neighbor blocks. For example, an intra-prediction mode of a neighbor block having relatively large size may be derived as the intra-prediction mode of the current block. Alternatively, a statistical value may be calculated by assigning a large weight on an intra-prediction mode of a block having relatively large size.

Alternatively, whether or not the intra-prediction mode of the neighbor block is angular mode may be considered. For example, when the intra-prediction mode of the neighbor block is a non-angular mode, the non-angular mode may be derived as the intra-prediction mode of the current block. Alternatively, an intra-prediction mode of other neighbor block, except for the non-angular mode, may be derived as the intra-prediction mode of the current block.

In order to derive the intra-prediction mode of the current block, a most probable mode (MPM) list may be configured by using an intra-prediction mode of a neighbor block. A number N of candidate modes included in an MPM list may be fixed, or may be determined according to a size or form or both of the current block. The MPM list may be configured not to include an overlapped mode. When a number of available candidate modes is smaller than N, a predetermined candidate mode among available candidate modes, for example, a mode obtained by adding or subtracting a predetermined offset to an angular mode may be added to the MPM list. Alternatively, at least one of a horizontal mode, a vertical mode, a 45 angular mode, a 135 angular mode, a 225 angular mode, and a non-angular mode may be added to the MPM list. The predetermined offset may be 1, 2, 3, 4, or a positive integer.

The MPM list may be configured in a predetermined sequence based on a position of the neighbor block. For example, the predetermined sequence may be a sequence of blocks adjacent to a left side, an upper side, a left lower corner side, a right upper corner side, and a left upper corner side of the current block. A non-angular mode may be included in the MPM list at an arbitrary position. For example, it may be added next to intra-prediction modes of blocks adjacent to a left side and an upper side.

As another embodiment, the intra-prediction mode of the current block may be derived by using an intra-prediction mode derived by using an MPM list and an intra-prediction mode of a neighbor block. For example, when the intra-prediction mode derived by using the MPM list is Pred_mpm, the Pred_mpm may be changed by using the intra-prediction mode of the neighbor block. For example, when Pred_mpm is larger than the intra-prediction mode of the neighbor block (or larger than a statistical value of at least two intra-prediction modes), Pred_mpm may be increased by n, otherwise, Pred_mpm may be decreased by n. Herein, n may be a predetermined integer such as +1, +2, +3, 0, −1, −2, −3, etc. The intra-prediction mode of the current block may be derived as the changed Pred_mpm. Alternatively, when at least one of Pred_mpm and intra-prediction modes of the neighbor block is a non-angular mode, the intra-prediction mode of the current block may be derived as the non-angular mode. Alternatively, the intra-prediction mode of the current block may be derived as an angular mode.

When an MPM flag is 0, a second MPM list including at least one intra-prediction mode may be configured, and the intra-prediction mode of the current block may be derived by using a second MPM index (2nd_mpm_idx). Herein, a second indicator (for example, a second MPM flag) indicating whether or not the intra-prediction mode of the current block is included in the second MPM list may be encoded/decoded. Similar to a first MPM list, the second MPM list may be configured by using intra-prediction modes of the neighbor block. Herein, the intra-prediction mode included in the first MPM list may not be included in the second MPM list. A number of MPM lists is not limited to 1 or 2, N MPM lists may be used.

When the intra-prediction mode of the current block is not included in one of a plurality of MPM lists, a luma component intra-prediction mode of the current block may be encoded/decoded. In addition, a chroma component intra-prediction mode may be derived and encoded/decoded based on an associated luma component intra-prediction mode.

When the current block is partitioned into a plurality of sub-blocks, in order to derive an intra-prediction mode of each sub-block, at least one of the described methods may be applied.

A size or form or both of a sub-block may be a predetermined size or block or both (for example, 4×4), or may be determined according to a size or form or both of the current block. Alternatively, the size of the sub-block may be determined based on whether or not a neighbor block of the current block is partitioned, or may be determined based on an intra-prediction mode of a neighbor block of the current block. For example, the current block may be partitioned based on a boundary at which an intra-prediction mode of a neighbor block is different. Alternatively, the current block may be partitioned based on whether the neighbor block is an intra coding block or an inter coding block.

An indicator (for example, NDIP_flag) representing that the intra-prediction mode of the current block is derived by using the intra-prediction mode of the neighbor block may be encoded/decoded. The indicator may be encoded/decoded by at least one unit of the current block and the sub-block. Herein, when a size of the current block or the sub-block corresponds to a predetermined size or a predetermined size range, the indicator may be encoded/decoded.

Determining whether or not the size of the current block corresponds to a predetermined size may be performed based on a horizontal or vertical length of the current block. For example, when the horizontal or vertical length is a length capable of being partitioned, it is determined that the size of the current block corresponds to a predetermined size.

When the current block is partitioned into a plurality of sub-blocks, an intra-prediction mode of the plurality of sub-blocks may be derived in a zig-zag sequence, or may be derived in parallel. An intra-prediction mode of the sub-block may be derived by at least one of methods of deriving the intra-prediction mode of the current block. Herein, the neighbor block of the current block may be used as a neighbor block of each sub-block. Alternatively, the sub-block within the current block may be used as a neighbor block of each sub-block.

An intra-prediction mode of a sub-block included in a current block may be derived by using an average value of an intra-prediction mode of the current block and an intra-prediction mode of a block adjacent to a left and upper side of a sample positioned at (0, 0) of each sub-block. For example, when an intra-prediction mode of a current block is larger than the above average value, the half of the above average value may be subtracted from the derived intra-prediction mode. When the intra-prediction mode of the current block is equal to or less than the above average value, the half of the above average value may be added to the derived intra-prediction.

Intra-prediction information of may be signaled through at least one of a video parameter set (VPS), a sequence parameter set (SPS), a picture parameter set (PPS), an adaptation parameter set (APS), a slice header, and a tile header. In a predetermined block size or less, at least one piece of intra-prediction information may not be signaled.

Herein, intra-prediction information of a previously encoded/decoded block (for example, higher block) may be used.

A reference sample for intra-prediction may be configured based on the derived intra-prediction mode. In the description hereinafter, a current block may mean a prediction block or a sub-block having a size/form smaller than a size/form of the prediction block. The reference sample may be configured by using at least one sample reconstructed adjacent to a current block or by using a combination of samples. In addition, filtering may be applied to the configured reference sample.

A number or position or both of reconstructed sample lines used for configuring the reference sample may vary according to a position of a current block within a coding tree block. Each reconstructed sample on a plurality of reconstructed sample lines may be used as a reference sample at it is. Alternatively, a predetermined filter may be applied to the reconstructed sample, and a reference sample may be generated by using the filtered reconstructed sample. Reconstructed samples to which a filter is applied may be included in the same reconstructed sample line or in different reconstructed sample lines.

The configured reference sample may be represented as ref[m, n], and a sample obtained by applying a filter to the configured reference sample may be represented as rec[m, n]. Herein, m or n may be a predetermined integer value representing a position of a sample. When a position of a left upper side sample within the current block is (0, 0), a position of a left upper side reference sample of the current block may be set to (−1, −1).

Figure 6:
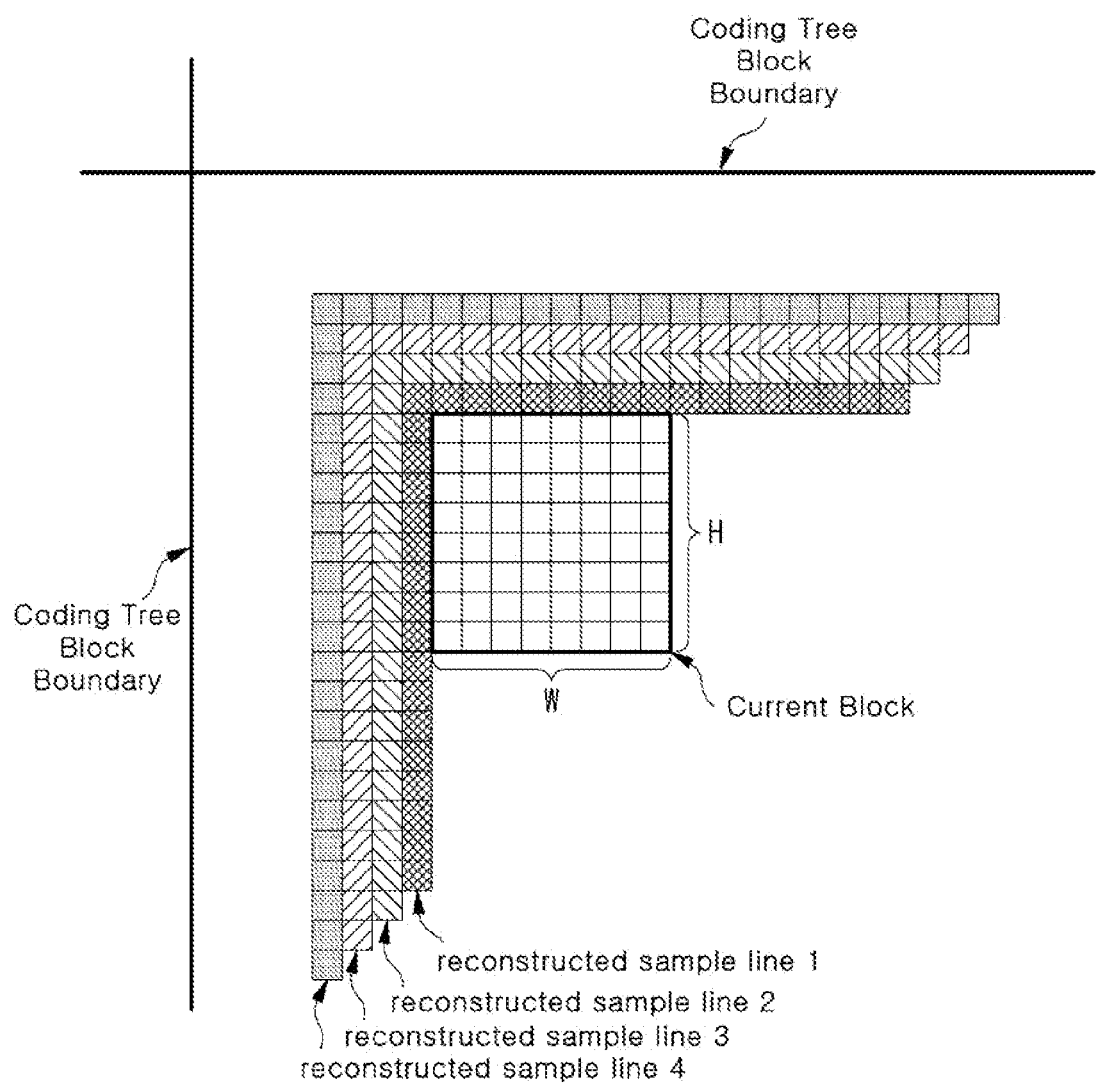
FIG. 6 is a view showing an example of configuring a reference sample line when a current block is not adjacent to a CTU boundary.

FIG. 6 is a view showing an example of configuring a reference sample line when a current block is not adjacent to a CTU boundary.

Figure 7:
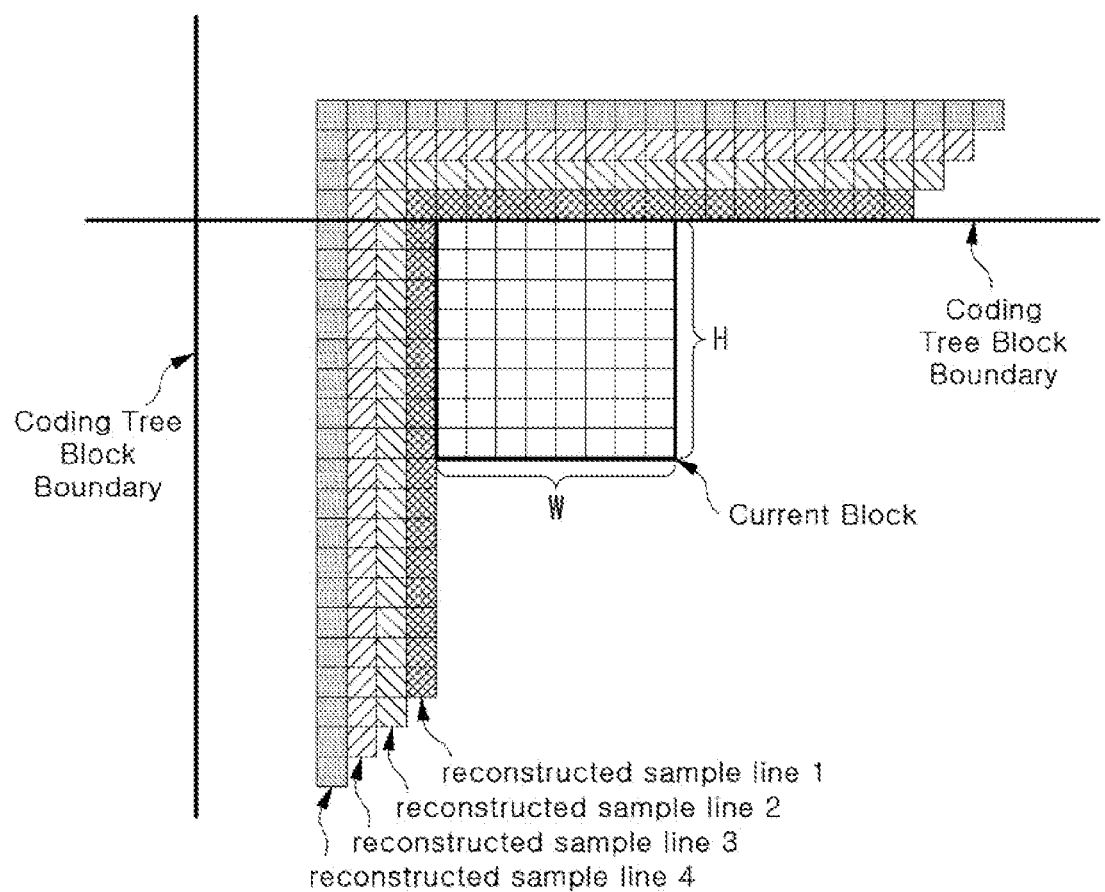
FIG. 7 is a view showing an example of configuring a reference sample line when a current block is adjacent to a CTU boundary.

FIG. 7 is a view showing an example of configuring a reference sample line when a current block is adjacent to a CTU boundary.

At least one reference sample line may be configured by using at least one of a plurality of reconstructed sample lines shown in FIG. 6 and FIG. 7. Herein, a position or length or both of the used at least one reconstructed sample line may be determined based on a position of a current block within a predetermined image region. The predetermined image region may mean at least one of a picture, a slice, a slice segment, a tile, and a coding block (e.g., a coding block partitioned based on at least one of a coding tree block, and quad-tree/binary-tree). For example, a reconstructed sample line to be used may be selected by considering whether or not at least one block boundary of the current block is adjacent to the boundary of the predetermined image region.

As shown in FIG. 6, all of usable reconstructed sample lines (reconstructed sample lines 1 to 4) may be positioned within a CTU identical to a current block. Alternatively, as shown in FIG. 7, all or a partial of usable reconstructed sample lines may be positioned within a CTU different from the current block.

According to an embodiment of the present invention, a single reference sample line may be configured by using a single reconstructed sample line adjacent to a current block.

In the example shown in FIG. 6, an identical reconstructed sample line may be used for an upper side and a left side of the current block. For example, the reference sample line of the current block may be configured by using a reconstructed sample line 2 for both of upper side and the left side.

In the example shown in FIG. 7, reconstructed sample lines different from each other may be used for an upper side and a left side of the current block. For example, a reference sample line may be configured by using a reconstructed sample line 1 for the upper side of the current block as the Formula 1 below, and using a reconstructed sample line 2 for the left side of the current block.

$$ref[x, -1] = rec[x, -1], (x = -1 \sim 2^*W - 1)$$ [Formula 1]
$$ref[-1, y] = rec[-2, y], (y = 0 \sim 2^*H - 1)$$

According to another embodiment of the present invention, a single reference sample line may be configured by using at least two reconstructed sample lines adjacent to a current block.

Herein, a weighted sum of reconstructed samples on at least two reconstructed sample lines may be used based on a distance from a current block or an intra-prediction mode angle or both. A weight may be determined based on at least one of an intra-prediction mode of the current block (e.g., a prediction mode value, whether or not an angular mode is, angle of an angular mode, etc.), a block size/form, partition information, neighbor encoding information (neighbor intra-prediction mode, block size/form, partition information, etc.), or an arbitrary filter (for example, at least one of a 3-tap filter, a 5-tap filter, and a 7-tap filter). When a distance from the current block becomes larger, a larger weight may be assigned.

In the example shown in FIG. 6, identical reconstructed sample lines may be used for both of the upper side and the left side. For example, as the Formula 2 below, the reference sample may be configured by using a weighted sum of the reconstructed sample line 1 and the reconstructed sample line 2.

$$ref[-1, -1] =$$ [Formula 2]
$$(rec[-2, -1] + 2^*rec[-1, -1] + rec[-1, -2] + 2) >> 2$$
$$ref[x, -1] = (rec[x, -2] + 3^*rec[x, -1] + 2) >> 2,$$
$$(x = 0 \sim 2^*W - 1)$$
$$ref[-1, y] = (rec[-2, y] + 3^*rec[-1, y] + 2) >> 2,$$
$$(y = 0 \sim 2^*H - 1)$$

In the example shown in FIG. 7, reconstructed sample lines different from each other may be used for the upper side and the left side. For example, as the Formula 3 below, the reference sample may be configured by using reconstructed sample lines 1 and 2 for the left side of the current block, and using the reconstructed sample line 1 for the upper side of the current block.

$$ref[-1, -1] = (rec[-2, -1] + 3^*rec[-1, -1] + 2) >> 2$$ [Formula 3]
$$ref[x, -1] = rec[x, -1], (x = 0 \sim 2^*W - 1)$$
$$ref[-1, y] = (rec[-2, y] + 3^*rec[-1, y] + 2) >> 2,$$
$$(y = 0 \sim 2^*H - 1)$$

In the above embodiment of configuring a single reference sample line by using at least two reconstructed sample lines, the weighted sum may be replaced with at least one of an average value, a maximum value, a minimum value, and a median value. The reconstructed sample used in the reconstructed sample line may be variably determined according to a position of a current sample, or may be determined to a fixed positional sample. The fixed positional sample may vary according to a direction or angle of an intra-prediction mode.

For example, in the example shown FIG. 6, a reference sample may be configured as the Formula 4 below by using a maximum value of reconstructed sample lines 1 to 3 for both of the upper side and the left side of the current block. max (a, b, c) is a function outputting the largest value among a, b, and c.

[Formula 4]
$$ref[-1, -1] =$$
$$\max(\max(rec[-3, -3], rec[-2, -3], rec[-1, -3]),$$
$$\max(rec[-3, -2], rec[-2, -2], rec[-1, -2]),$$
$$\max(rec[-3, -1], rec[-2, -1], rec[-1, -1]))$$
$$ref[x, -1] = \max(rec[x, -1], rec[x, -2], rec[x, -3]),$$
$$(x = 0 \sim 2^*W - 1)$$
$$ref[-1, y] = \max(rec[-1, y], rec[-2, y], rec[-3, y]),$$
$$(y = 0 \sim 2^*H - 1)$$

For example, in the example shown in FIG. 7, a reference sample may be configured as the Formula 5 below by using a maximum value of reconstructed sample lines 1 to 3 for the left side of the current block, and using a maximum value of reconstructed sample lines 1 and 2 for the upper side of the current block.

[Formula 5]
$$ref[-1, -1] =$$
$$\max(0, \max(rec[-3, -2], rec[-2, -2], rec[-1, -2]),$$
$$\max(rec[-3, -1], rec[-2, -1], rec[-1, -1]))$$
$$ref[x, -1] = \max(rec[x, -1], rec[x, -2], 0), (x = 0 \sim 2^*W - 1)$$
$$ref[-1, y] = \max(rec[-1, y], rec[-2, y], rec[-3, y]),$$
$$(y = 0 \sim 2^*H - 1)$$

According to another embodiment of the present invention, at least two reference sample lines may be configured by using at least two reconstructed sample lines adjacent to a current block.

In the example shown in FIG. 6, at least two reference sample lines may be configured by using at least two reconstructed sample lines for both of the upper side and the left side of the current block. For example, the reconstructed sample lines 1 and 2 may be respectively selected for reference sample lines 1 and 2 of the current block.

In the example shown in FIG. 7, at least two reference sample lines may be configured by using reconstructed sample lines different from each other for the upper side and the left side of the current block. For example, reference sample lines 1 and 2 may be configured as the Formula 6 below by using reconstructed sample lines 1 and 2 for the left side of the current block and using the reconstructed sample line 1 for the upper side of the current block.

[Formula 6]
$$ref[x, -1] = rec[x, -1], (x = -1 \sim 2^*W - 1)$$
$$ref[-1, y] = rec[-1, y], (y = 0 \sim 2^*H - 1)$$
$$ref[-2, -2] = ref[-2, -1] = rec[-1, -1]$$
$$ref[x, -2] = rec[x, -1], (x = -1 \sim 2^*W - 1)$$
$$ref[2^*W, -2] = rec[2^*W - 1, -1]$$
$$ref[-2, y] = rec[-2, y], (y = 0 \sim 2^*H)$$

As another example of configuring at least two reference sample lines by using at least two reconstructed sample lines adjacent to a current block, a plurality of reference sample lines may be configured by using at least one of a weighted sum, an average value, a maximum value, a minimum value, and a median value of at least one reconstructed sample based on a distance from the current block or an angle of an intra-prediction mode or both. The reconstructed sample used in the reconstructed sample line may variably determined according to a position of a current sample, or may be determined to a fixed positional sample. The fixed positional sample may vary according to a direction or an angle of an intra-prediction mode.

In one example, each reference sample line may be configured based on a weighted sum using different weights differently assigned according to a distance from the current block, and a maximum value of a reconstructed sample. The reconstructed sample line used for the weighted sum and the reconstructed sample line used for the maximum value may be different.

In the example shown in FIG. 6, the reference sample may be configured by using an identical number of reconstructed sample lines for both of the upper side and the left side of the current block. For example, as the Formula 7 below, a reference sample line 1 may be configured by a weighted sum of reconstructed sample lines 1 and 2, and a reference sample line 2 may be configured by a maximum value of reconstructed sample lines 2 to 4.

[Formula 7]
$$ref[-1, -1] =$$
$$(rec[-2, -1] + 2^*rec[-1, -1] + rec[-1, -2] + 2) >> 2$$
$$ref[x, -1] = (rec[x, -2] + 3^*rec[x, -1] + 2) >> 2,$$
$$(x = 0 \sim 2^*W - 1)$$
$$ref[-1, y] = (rec[-2, y] + 3^*rec[-1, y] + 2) >> 2,$$
$$(y = 0 \sim 2^*H - 1)$$
$$ref[-2, -2] =$$
$$\max(\max(rec[-4, -4], rec[-3, -4], rec[-2, -4]),$$
$$\max(rec[-4, -3], rec[-3, -3], rec[-2, -3]),$$
$$\max(rec[-4, -2], rec[-3, -2], rec[-2, -2]))$$
$$ref[x, -2] = \max(rec[x, -2], rec[x, -3], rec[x, -4]),$$
$$(x = 0 \sim 2^*W)$$
$$ref[-2, y] = \max(rec[-2, y], rec[-3, y], rec[-4, y]),$$
$$(y = 0 \sim 2^*H)$$

In the example shown in FIG. 7, the reference sample may be configured as by using different reconstructed sample lines for the upper side and the left side of the current block. For example, as the Formula 8 below, a reference sample line 1 may be configured by using a weighted sum of reconstructed sample lines 1 and 2 for the left side of the current block, and a reference sample line 2 may be configured by using a maximum value of reconstructed sample lines 2 to 4. In addition, reconstructed sample lines 1 and 2 may be configured by using the reconstructed sample line 1 for the upper side of the current block.

$$ref[x, -1] = rec[x, -1], (x = -1 \sim 2^*W - 1) \quad \text{[Formula 8]}$$
$$ref[-1, y] = (rec[-2, y] + 3^*rec[-1, y] + 2) >> 2,$$
$$(y = 0 \sim 2^*H - 1)$$
$$ref[-2, -2] = ref[-2, -1] = rec[-1, -1]$$
$$ref[x, -2] = rec[x, -1], (x = -1 \sim 2^*W - 1)$$
$$ref[2^*W, -2] = rec[2^*W - 1, -1]$$
$$ref[-2, y] = \max(rec[-2, y], rec[-3, y], rec[-4, y]),$$
$$(y = 0 \sim 2^*H)$$

Information representing that the reference sample is configured by using at least one of the above described methods may be encoded/decoded, or may be implicitly derived in a decoder. Alternatively, when information of reference sample shifting is encoded/decoded, at least one of below entropy encoding methods may be used, and the information is finally encoded/decoded by using a CABAC (ae (v)) after being binarized.

a truncated rice binarization method
a K-th order exp_Golomb binarization method
a restricted K-th order exp_Golomb binarization method
a fixed-length binarization method
a unary binarization method
a truncated unary binarization method An embodiment in which an upper boundary of a current block is a boundary of a CTU has been described with reference to FIG. 7. However, it is not limited thereto, the embodiment of the present invention may be applied when a left boundary of the current block is a boundary of a CTU. Herein, in the above described embodiment, a left side and an upper side may be switched and applied.

When both of an upper boundary and a left boundary of a current block are boundaries of a CTU, an identical reconstructed sample line may be used for an upper side and a left side of the current block. Alternatively, a number of reconstructed sample lines which is larger than a number of reconstructed sample lines that may be used for the upper side of the current block may be used for the left side of the current block. This is because, a resource required for storing a reconstructed sample line included in a CTU adjacent to the upper side of the current block is relatively larger than a resource required for storing a reconstructed sample line included in a CTU adjacent to the left side of the current block.

Alternatively, when an upper boundary of a current block is a boundary of a CTU, all of upper side reference samples may be determined to be non-available. Herein, an upper side reference sample may be configured by using a left side reference sample. Alternatively, when a left boundary is a boundary of a CTU, a left side reference sample may be configured by using an upper side reference sample.

In the above embodiment, the boundary of the CTU may be replaced with a boundary of a predetermined image region. The predetermined image region includes, as described above, a picture, a slice, a slice segment, a tile, etc.

Intra-prediction may be performed by retrieving a block that is mostly similar to a current block from a neighbor reconstructed sample rec[m, n] (hereinafter, referred as "similar block"). Herein, at least one of positional information m and n of the similar block may be entropy encoded/decoded. Alternatively, a decoder may derive positional information of the similar block by performing an identical process with an encoder.

The derived similar block may be used as a prediction block of the current block. Alternatively, at least one reference sample line of the derived similar block may be used as a reference sample of the current block. Alternatively, a reference sample of the current block may be derived by using at least one of at least one reference sample line of the current block and at least one reference sample line of the similar block. Herein, for example, a weighted sum may be used. Alternatively, an upper side reference sample and a left side reference sample of the current block may be respectively configured from different reference sample lines.

Alternatively, by performing intra-prediction of the current block, a first residual signal is obtained. Herein, the used intra-prediction mode is applied to the similar block to obtain a second residual signal, and a residual signal of the current block may be generated by using residual values of the first residual signal and the second residual signal.

When selecting a reference sample of the current block for inter-prediction, an optimized reference sample of the current block may be configured by retrieving all available reconstructed samples present in the reconstructed left side and upper side samples. Herein, a reference sample may be configured by shifting the retrieved reconstructed samples to a position whereby the shifted samples may be used when intra-predicting. Information of shifting the reference sample may be entropy encoded/decoded, or may be implicitly derived in an encoder/decoder.

After configuring the reference sample of the current block, the reference sample of the current block may be re-configured by exchanging and replacing reference samples with at least one reference sample unit. For example, a sample that is present on an upper side reconstructed sample line or an upper side reference sample line, a sample on a left side reference sample line by using a sample group, or a sample group may be exchanged or replaced or both.

The current block may be partition into at least one prediction block according to a size or form or both of the current block. An identical reference sample may be used for the partitioned prediction blocks. Herein, a parallel process may be possible for at least one prediction block included in the current block Alternatively, different reference samples may be used for the partitioned prediction blocks. For example, when the current block is partitioned into prediction blocks of an upper side and a lower side, a correlation between an upper side reference sample of the current block with the lower side prediction block may be low. Herein, the upper side reference sample may be compensated to be used as a reference sample of the prediction block. For compensating, reference samples of a left side reference sample line may be used. For example, residual values of a sample of (−1, −1) position and a sample of (−1, H/2−1) position may be used. Herein, H is a height of the current block. The residual value or a value obtained by scanning the residual value may be applied to the upper side reference sample. A method of configuring the reference sample may be similarly applied when the current block is partitioned into left side and right side prediction blocks or into at least two prediction blocks.

In order to configure the reference sample, whether or not a neighbor reconstructed sample is available may be determined. When a neighbor reconstructed sample is positioned outside of at least one region of a picture, a slice, a tile, and a CTU, it may be determined as not available. Alternatively, when constrained intra prediction is performed on the current block, the neighbor reconstructed sample may be determined as not available when the neighbor reconstructed sample is positioned at a block that is inter encoded/decoded.

When the neighbor reconstructed sample is determined as non-available, the non-available sample may be replaced by using a neighbor available reconstructed sample. For example, the non-available sample may be replaced by using a neighbor available sample starting from a left lower side sample position. Alternatively, the non-available sample may be replaced by combing available samples. For example, the non-available sample may be replaced by using an average value of available samples which are positioned at both ends of the non-available sample.

Alternatively, non-available samples may be replaced by using information of available reference samples. Herein, the non-available sample may be replaced with an arbitrary value that is not a neighbor available sample value. The arbitrary value may be an average value of available sample values, or a value considering a gradient of available sample values. Alternatively, both of the average value and the gradient may be used. The gradient may be determined based on residual values of neighbor available samples. Alternatively, the gradient may be determined based on the average value and the residual value of the available sample value. Except for the average value, a maximum value, a minimum value, a median value, or a weighted sum using an arbitrary weight may be used. The arbitrary weight may be determined based on a distance between an available sample and a non-available sample.

The above methods may be applied to all upper side and left side reference samples, or may be applied to an arbitrary angle. In addition, when a reference sample line of a current block is configured by using a plurality of reconstructed sample lines, the above method may be applied.

Whether or not to apply filtering to at least one reference sample configured as above may be determined based on at least one of an intra-prediction mode of a current block and a block size/form. When filter is applied, a filtering type may vary according to at least one or an intra-prediction mode, a size, and a form of the current block.

Intra-prediction of the current block may be performed based on the derived intra-prediction mode and the reference sample.

In case of a DC mode, an average value of at least one reference sample among the configured reference sample may be used. Herein, filtering may be applied to at least one prediction sample positioned at a boundary of the current block.

In case of a planar mode, a weighted sum considering a distance from the at least one configured reference sample according to a position of a sample being a target of intra-prediction of the current block may be used.

In case of an angular mode, at least one reference sample positioned at a predetermined angle and present adjacent in the position of the intra-prediction target sample may be used.

In case of an intra-prediction mode based on positional information, a reconstructed sample block generated based on encoded/decoded or derived positional information may be used as an intra prediction block of a current block.

Alternatively, a decoder may derive by retrieving a reconstructed sample block that will be used as an intra prediction block of a current block.

Intra-prediction of a chroma signal may be performed by using a reconstructed luma signal of a current block. In addition, intra-prediction of other chroma signal Cr may be performed by using a single reconstructed chroma signal Cb of the current block.

Inter-prediction may be performed by combining the at least one above method. For example, an intra prediction block of a current block may be configured by using a weighted sum of a predicted block using a predetermined non-angular intra-prediction mode and a predicted block using a predetermined angular intra-prediction mode. Herein, a weight may be differently applied according to at least one of an intra-prediction mode, a block size, and a sample position.

When at least one reference sample line is used, an intra prediction block may be generated by assigning weights different from each other according to a distance to the current block or an angle or both. A weighted sum may be an arbitrary filter precision according to at least one of an intra-prediction mode, a block size/form, partition information, neighbor encoding information (neighbor intra-prediction mode, block size/form, partition information, etc.) of a current block.

In case of an angular mode, the configured reference sample may be re-configured based on an angular prediction mode. For example, when the angular prediction mode is a mode using all of left side and upper side reference samples, a one-dimensional array may be configured for the left side or upper side reference sample. Alternatively, an upper side reference sample may be configured by shifting a left side reference sample, or an upper side reference sample may be configured by using a weighted sum of at least one left side reference sample.

Inter-prediction in angles different from each other may be performed on a predetermined sample group unit of a current block. The predetermined sample group unit may be a block, a sub-block, a line or a singular sample.

In case of a planar mode, a weighted sum of an upper side reference sample T, a left side reference sample L, a right upper side reference sample TR, and a left lower side reference sample BL based on a position of a prediction target sample may be used. Herein, a right lower side sample K may be derived by using a weighted sum of TR and BL. Samples of a low ray within a current block may be replaced with BL, and samples of a right column may be replaced with TR.

A sample present at an arbitrary position (x, y) within a current block may be predicted as a weighted sum considering a distance according to a position of each sample. For example, samples of a low row within the current block may be derived as a weighted sum according to BL and a K distance, and samples of a right column may be derived as a weighted sum of TR and a K distance.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:
1. An image decoding method comprising:
deriving an intra prediction mode of a current block;
deriving a reference sample of intra prediction for the current block from a plurality of reference sample lines; and
generating a prediction block by performing intra prediction for the current block based on the intra prediction mode and the reference sample,
wherein the deriving the reference sample of intra prediction for the current block comprises:
determining whether an upper boundary of the current block is an upper boundary of a current coding tree block or not; and
selecting a reference sample line for deriving the reference sample among the plurality of reference sample lines based on the determination, and
wherein, in response to the upper boundary of the current block being the upper boundary of the current coding tree block, the reference sample is derived using a first reference sample line adjacent to the current block among the plurality of reference sample lines, and
wherein the current block is obtained by dividing the current coding tree block using at least one of a quad-tree division method or a binary-tree division method.

2. The method of claim 1,
wherein different number of reference samples lines are available according to whether the boundary of the current block is the boundary of the current coding tree block.

3. The method of claim 1,
wherein, in response to the boundary of the current block not being the boundary of the current coding tree block, the reference sample is derived using a second reference sample line of the current block among the plurality of reference sample lines, and
wherein the second reference sample line is adjacent to the first reference sample line.

4. The method of claim 1,
wherein the intra prediction mode of the current block is derived based on an intra prediction mode of a left neighboring block and an intra prediction mode of an upper neighboring block, the left neighboring block being a block adjacent to a lower-left side of the current block and the upper neighboring block being a block adjacent to a upper-right side of the current block.

5. The method of claim 4,
wherein the intra prediction mode of the current block is derived based on a statistic value of the intra prediction mode of the left neighboring block and the intra prediction mode of the upper neighboring block.

6. The method of claim 5,
wherein all of a maximum value and a minimum value are used as the statistic value.

7. The method of claim 1,
wherein the deriving the intra prediction mode of the current block comprises
decoding a first flag indicating whether the intra prediction mode is identical to a mode included in a first Most Probable Mode (MPM) list including at least one mode; and
determining the mode included in the first MPM list as the intra prediction mode in response to the first flag being a first value.

8. The method of claim 7,
wherein the deriving the intra prediction mode of the current block comprises:
configuring a second MPM list including at least one mode in response to the first flag being a second value;
decoding index information indicating a mode identical to the intra prediction mode of the current block; and
deriving the intra prediction mode of the current block using the second MPM list and the index information.

9. An image encoding method comprising:
determining an intra prediction mode of a current block;
deriving a reference sample of intra prediction for the current block from a plurality of reference sample lines; and
generating a prediction block by performing intra prediction for the current block based on the intra prediction mode and the reference sample,
wherein the deriving the reference sample of intra prediction for the current block comprises:
determining whether an upper boundary of the current block is an upper boundary of a current coding tree block or not; and
selecting a reference sample line for deriving the reference sample among the plurality of reference sample lines based on the determination, and
wherein, in response to the upper boundary of the current block being the upper boundary of the current coding tree block, the reference sample is derived using a first reference sample line adjacent to the current block among the plurality of reference sample lines, and
wherein the current block is obtained by dividing the current coding tree block using at least one of a quad-tree division method or a binary-tree division method.

10. The method of claim 9,
wherein different number of reference samples lines are available according to whether the boundary of the current block is the boundary of the current coding tree block.

11. The method of claim 9,
wherein, in response to the boundary of the current block not being the boundary of the current coding tree block, the reference sample is derived using a second reference sample line of the current block among the plurality of reference sample lines, and
wherein the second reference sample line is adjacent to the first reference sample line.

12. The method of claim 9,
wherein the intra prediction mode of the current block is encoded based on an intra prediction mode of a left neighboring block and an intra prediction mode of an upper neighboring block, the left neighboring block being a block adjacent to a lower-left side of the current block and the upper neighboring block being a block adjacent to an upper-right side of the current block.

13. The method of claim 12,
wherein the intra prediction mode of the current block is encoded based on a maximum value and a minimum value of the intra prediction mode of the left neighboring block and the intra prediction mode of the upper neighboring block.

14. The method of claim 9, further comprising
encoding the intra prediction mode of the current block,
wherein the encoding the intra prediction mode comprises:
determining whether the intra prediction mode is identical to a mode included in a first Most Probable Mode (MPM) list including at least one mode; and
encoding a first flag having a first value in response to the intra prediction mode being identical to a mode included in the first MPM list.

15. The method of claim 14,
wherein the encoding the intra prediction mode comprises:
configuring a second MPM list including at least one mode in response to the intra prediction mode not being identical to a mode included in the first MPM list;
determining an index indicating a mode identical to the intra prediction mode of the current block among modes included in the second MPM list; and
encoding the first flag having a second value and the index.

16. A method of transmitting a bitstream, the method comprising:
determining an intra prediction mode of a current block;
deriving a reference sample of intra prediction for the current block from a plurality of reference sample lines;
generating a prediction block by performing intra prediction for the current block based on the intra prediction mode and the reference sample; and
transmitting the bitstream generated based on the prediction block,
wherein the deriving the reference sample of intra prediction for the current block comprises:

determining whether an upper boundary of the current block is an upper boundary of a current coding tree block or not; and selecting a reference sample line for deriving the reference sample among the plurality of reference sample lines based on the determination, and wherein, in response to the upper boundary of the current block being the upper boundary of the current coding tree block, the reference sample is derived using a first reference sample line adjacent to the current block among the plurality of reference sample lines, and wherein the current block is obtained by dividing the current coding tree block using at least one of a quad-tree division method or a binary-tree division method.

* * * * *